Patented Sept. 4, 1945

2,384,236

UNITED STATES PATENT OFFICE 2,384,236

PRINTING INK

Clinton Arbie Carlton, Borger, Tex., assignor to J. M. Huber Corporation, Borger, Tex., a corporation of Delaware No Drawing. Application June 4, 1941,
Serial No. 396,529

3 Claims. (Cl. 106—32)

This invention relates to printing ink and more particularly to the preparation of fluid inks containing carbon black.

The term "carbon black" has been applied, by those skilled in the art, to carbon which is obtained by the impingement of the flame from freely burning hydrocarbons upon a cold metallic surface. Such carbon black is very light, fluffy and bulky and hence is very difficult to handle. Before such carbon black is marketed, for use in inks as well as other purposes, it is usually treated by one of a number of methods to decrease its bulk and improve its handling properties. The bulky carbon black is some times agitated to remove some of the entrapped air and hence decrease its bulk and give it a higher apparent density. Such carbon black is known as agitated carbon black. In some instances, carbon black is pressed under high pressures to increase its apparent density and such carbon black is known as compressed carbon black. A third method of treating carbon black is to agitate it, either in the wet or the dry state, until it is all in the form of substantially dustless, small, irregular or round pellets which are free flowing. The product of this last method is known as compacted carbon black. All three types of densified carbon black have been proposed as pigments for printing inks. Others have found that the compacted carbon black is less easily dispersible in ink vehicles and produces inks of much higher viscosity than the other types of densified carbon black. This has been particularly pointed out in Patents 2,167,674 and 2,228,704 issued to Offutt.

The usual method, employed for the preparation of ink containing carbon as a pigment, comprises first stirring the pigment into the vehicle in any convenient manner and then completing the dispersion of the pigment by working the ink on a roller mill or by passing it through some type of colloid mill. It is desirable to incorporate as much carbon as possible into printing inks, particularly in news inks. The incorporation of the agitated and compressed carbon blacks, into the usual mineral oil vehicle, generally produces an ink of considerable viscosity when only about 14 pounds of carbon black are added to 100 pounds of oil. Offutt discloses that compacted carbon black produces inks of considerably higher viscosity and hence lesser amounts of such carbon can be incorporated into the vehicle to provide a satisfactory ink.

It is an object of my invention to provide a method for preparing inks containing carbon black in which larger amounts of carbon black can be employed without the production of excessive viscosities. Another object is to provide an ink containing a normal amount of carbon black, but which is of abnormally low viscosity. A further object is to provide improved ink pigments from compacted carbon black. A still further object is to provide improved printing inks containing carbon black. Other objects are to provide new compositions of matter and to advance the art. Still other objects will appear hereinafter.

The above and other objects may be accomplished in accordance with my invention which comprises grinding compacted carbon black until it has a materially lower apparent density and preparing inks from such ground compacted carbon black. I have found that, when compacted carbon black is ground to a fine state of division so that it has a materially lower apparent density, a greatly improved carbon black pigment is produced. Such pigment is readily dispersible in the usual ink vehicles. Larger amounts of such pigment can be incorporated in the vehicle to produce an ink of desired viscosity. Also, with a given amount of carbon black pigment in the vehicle, the ground compacted carbon black of my invention produces inks of materially lower viscosity.

Agitated carbon black and compressed carbon black are not the equivalents of compacted carbon black for my purpose. Neither agitated carbon black nor compressed carbon black of the same apparent density will produce inks of the same properties as will be obtained by the ground compacted carbon black of my invention. Both agitated carbon black and compressed carbon black may be disintegrated as in a hammer mill and employed in the preparation of inks, but the properties imparted to the inks thereby are substantially the same as the properties imparted to the inks by employing carbon black agitated or compressed to the same apparent density. In contrast to this, ground compacted carbon black, ground to the same apparent density, will produce inks of considerable lower viscosity.

The compacted carbon black, which is to be employed for the production of pigments in accordance with my invention, will usually have an apparent density of from 17 to 27 pounds per cubic foot. I preferably employ compacted carbon black of an apparent density of from about 20 to about 24 pounds per cubic foot. The compacted carbon black should be disintegrated or ground until it has an apparent density of from 3 to 14 pounds per cubic foot and preferably from about 4 to about 7 pounds per cubic foot. I have obtained the best results with compacted carbon black which has been ground from an apparent density of about 21 pounds per cubic foot until it has an apparent density of approximately 7 pounds per cubic foot.

Any suitable means for grinding carbon black may be employed. However, the best pigment is obtained by disintegrating the compacted carbon black by impact with a solid surface rather than by crushing. I have found a hammer mill to be the most desirable means for producing the ground compacted carbon black pigments of my invention. It is only necessary to grind the compacted carbon black in the dry state rather than in the ink vehicle. Satisfactory grinding of the compacted carbon black has not been obtained when it has been attempted to grind the carbon black while it is in the vehicle.

In order to more clearly illustrate my invention, the preferred modes of carrying the same into effect and the advantageous results to be obtained thereby, the following examples are given:

Example I

Two samples of ink were prepared by incorporating 15 pounds of carbon black into 100 pounds of medium viscosity mineral oil, first, by stirring vigorously, and finally, by treatment on a three roll ink mill. One sample was prepared from agitated carbon black, obtained by agitation to an apparent density of 10 pounds per cubic foot. The ink was very viscous. The second sample was prepared from ground compacted carbon black. The ground compacted carbon black was obtained by compacting carbon black into the form of pellets having an apparent density of 24 pounds per cubic foot and then grinding it to an apparent density of 9.15 pounds per cubic foot by passing it through a "Mikro pulverizer" which is a form of hammermill. This ink was very much less viscous than that prepared from the agitated black. Each ink presented a smooth surface when spread in a very thin film and no residue was obtained from either ink when washed through a 200 mesh sieve with kerosene.

Example II

Two samples of ink were prepared by incorporating 14 pounds of carbon black into 100 pounds of "Texaco #673 oil," first, by rapid agitation, and finally, by treatment on a three roll ink mill. In each case, the apparent density of the carbon black was about 7 pounds per cubic foot. One sample of carbon black was prepared by pulverizing carbon black which had been compressed to an apparent density of 20 pounds per cubic foot. The other was prepared by pulverizing carbon black which had been compacted into pellets having an apparent density of 21 pounds per cubic foot. The relative viscosities were compared by measuring the distance which a measured volume of the ink would flow down an inclined plate in a given time. The ink, prepared from the ground compressed carbon black, flowed 5.7 inches while that, prepared from the ground compacted carbon black, flowed 7.3 inches.

The "Texaco #673 oil," employed in this example, was a mineral oil having a specific gravity of .943 and a Saybolt Universal viscosity of 785 seconds at 100° F.

Example III

An ink was prepared by incorporating 14.9 pounds of agitated carbon black, having an apparent density of 12 pounds per cubic foot, into 100 pounds of mineral oil. Several inks were also prepared by incorporating various amounts of carbon black, having a density of 12 pounds per cubic foot, which had been prepared by disintegrating compacted carbon black, having an apparent density of 22 pounds per cubic foot, by means of a "Mikro pulverizer." The length of flow was compared.

| Type of black | Pounds of black per 100 lbs. oil | Inches flow |
|---|---|---|
| Agitated | 14.9 | 5.1 |
| Disintegrated compacted | 17.7 | 6.42 |
| Do | 18.9 | 5.2 |
| Do | 20.4 | 3.62 |

From these figures, it can be seen that an additional 4 pounds or 26.8% more of the disintegrated compacted carbon black could be added to obtain an ink of the same viscosity.

It will be understood that the above examples are given for illustrative purposes only and my invention is not limited thereto. Various modifications and variations thereof will be readily apparent to those skilled in the art without departing from the spirit of my invention. For example, while I have disclosed the use of a hammer mill to disintegrate the compacted carbon black, other types of grinding equipment, which will reduce dry compacted carbon black to a fine state of division, will be apparent to those skilled in the art and may be employed. However, I have found that those types of grinding equipment, which employ close clearances and tend to crush the carbon black between two surfaces, are much less desirable.

Also, the density of the compacted carbon black, which is to be employed for making the pigments of my invention, may vary considerably. However, compacted carbon black of a density greater than about 27 pounds per cubic foot is so dense that it is difficult to disintegrate it to a satisfactory condition. Furthermore, in place of the mineral oil, I may employ other vehicles commonly employed in the preparation of printing and news inks.

From the above description, it will be apparent that, by my invention, I have provided a new and improved ink pigment from carbon black. When such carbon black pigment is employed in a printing ink, it produces printing inks of lower viscosity than has been produced by the same amounts of other types of carbon black pigments. Hence, in accordance with my invention, ink of a desired viscosity can be obtained with a higher content of carbon black or, if desired, inks of lower viscosity are obtained with a desired carbon black content. Accordingly, it will be apparent that I have provided an improved ink pigment, improved inks and a method for producing improved ink pigments and inks.

I claim:

1. A printing ink comprising a news ink vehicle having incorporated therein ground compacted carbon black having an apparent density of not more than 14 pounds per cubic foot.

2. A printing ink comprising a mineral oil having incorporated therein ground compacted carbon black having an apparent density from about 7 to about 12 pounds per cubic foot.

3. A printing ink comprising a mineral oil having incorporated therein ground compacted carbon black having an apparent density of about 7 pounds per cubic foot.

CLINTON A. CARLTON.